(12) United States Patent
Smith et al.

(10) Patent No.: US 7,718,555 B1
(45) Date of Patent: *May 18, 2010

(54) CHEMICALLY PROTECTIVE LAMINATED FABRIC

(75) Inventors: W. Novis Smith, Philadelphia, PA (US); Charles Roberson, Greensboro, NC (US)

(73) Assignee: Lakeland Industries Inc, Ronkonkoma, NY (US)

( * ) Notice: Subject to any disclaimer, the term of this patent is extended or adjusted under 35 U.S.C. 154(b) by 792 days.

This patent is subject to a terminal disclaimer.

(21) Appl. No.: 11/528,936

(22) Filed: Sep. 28, 2006

(51) Int. Cl.
*B32B 27/12* (2006.01)
*D04H 1/00* (2006.01)

(52) U.S. Cl. .................... 442/50; 442/394; 442/395; 442/398; 442/401; 442/402

(58) Field of Classification Search ................... 442/50, 442/394, 395, 398, 401, 402
See application file for complete search history.

(56) References Cited

U.S. PATENT DOCUMENTS

| 6,045,900 A * | 4/2000 | Haffner et al. ........... 428/315.9 |
| 2003/0003308 A1 * | 1/2003 | Kashiba et al. ............. 428/413 |
| 2007/0172614 A1 * | 7/2007 | Lee ........................... 428/35.7 |

* cited by examiner

*Primary Examiner*—Ula C Ruddock
(74) *Attorney, Agent, or Firm*—John Lezdey & Assoc

(57) ABSTRACT

A fabric for chemical protective garments having at least two multilayered film laminates separated by a scrim forming a barrier chamber. The laminates are sandwiched between films of linear low density polyethylene and contain a different film from each other selected from ethyl vinyl alcohol, polyethylene terephthalate and polyamide. There is also the garment prepared with the fabric.

18 Claims, 1 Drawing Sheet

CHEMICALLY PROTECTIVE LAMINATED FABRIC

FIELD OF THE INVENTION

The present invention relates to a composite material particularly useful in making chemical protective garments and barriers. In particular, this invention relates to laminates suitable for use in protective garments. In addition, this invention relates to a lightweight laminated fabric, comprised of multilayered films containing more than one barrier layer and a high loft scrim forming a space to retard chemical penetration.

BACKGROUND OF THE INVENTION

In particular situations people may encounter harmful concentrations of hazardous chemicals. In such situations, it is necessary to wear chemical protective garments of special composition and construction. These protective garments are necessary for providing an effective barrier between the wearer and the chemicals encountered. However, as pointed out in U.S. Pat. No. 4,855,178 (Langley), in addition to providing an effective chemical barrier, materials for chemical protective garments should meet practical requirements for amenability to fabrication by existing methods (e.g., heat bonding of seams) as well as for providing sufficient strength to prevent tearing and the resulting loss of protection.

General practice in the protective garment trade is to construct chemical protective garments by seaming together panels of chemical protective garment material. These seams may be formed in a number of ways. The seams may be formed by traditional methods of sewing and then covering the seam with a layer of heat sealing tape. Alternatively, the seams may be formed by heat or ultrasonic welding of the garment material. These seams may utilize adhesives.

Suitable chemical protective garment materials must be flexible to allow manipulation during seaming on standard seaming equipment, whether it be by sewing, adhesives or heat sealing. The chemical protective garment materials must also be of a composition that allows the formation of strong sealed seams, whether these seams are sewn and taped, adhesively joined or whether they are welded by heat or ultrasonic energy.

In addition, chemical protective garments must be durable in use. The garments must not develop structural failures during use which would expose the wearer to hazardous chemicals. Thus, the chemical protective garment materials and the seams created in constructing the garments must be strong and resistant to structural failure (e.g., the tearing, cracking or shrinking).

In many situations, it is not feasible to decontaminate chemical protective garments after exposure to hazardous chemicals. A chemical protective garment contaminated with a hazardous chemical is generally considered as hazardous waste. There is limited space for the storage and burial of hazardous wastes. Chemical protective garments intended for limited-use, should be light in weight to reduce the burden on storage and disposal.

Strong, lightweight chemical protective garment materials made from laminates of different materials are known. U.S. Pat. No. 4,272,851 (Goldstein) describes a film of polyethylene that may be laminated to nonwoven chemical protective apparel. U.S. Pat. No. 4,772,510 (McClure) describes a chemical barrier film laminated to a nonwoven substrate using an adhesive. Other laminates having multiple barrier layers are described in U.S. Pat. No. 4,855,178 (Langley); U.S. Pat. No. 4,833,010 (Langley) and U.S. Pat. No. 5,035,941 (Blackburn).

Often, each layer of a chemical protective garment material is chosen to impart a specific property to the composite fabric. Some layers provide strength while other layers may be chosen to provide permeation resistance against specific classes of chemicals. Additional layers add weight and stiffness. However, stiff garments are difficult to assemble and reduce the wearer's mobility.

There has been a general trend in the protective garment art to add additional layers to chemical protective garment materials to increase and broaden resistance to various classes of chemicals. This adds weight, stiffness and cost to these materials. For example, EP-0 434 572 (Boyer et al.) discloses a six (6) layered chemical protective garment material employing polyvinylidene chloride coated polyethylene terephthalate (PET) as the chemical barrier layer. The material comprises a nonwoven substrate, a layer of polyethylene, an adhesive layer, a layer of polyvinylidene chloride coated PET film, another layer of adhesive, and finally a layer of polyethylene. U.S. Pat. No. 4,920,575 (Bartasis) discloses a multi-layered structure that may contain one or two layers of a polyester film.

Other multi-layer films for protective use have been disclosed. For example, Tung, in U.S. Pat. No. 5,250,350, discloses a modified burn characteristic SARANEX® film in the form of a four or five layer film product. Additionally, Boye et al., in U.S. Pat. No. 5,162,148 describe a laminated material comprising a polyolefin nonwoven substrate and a five layer coextruded film with a polyolefin outer layer and an intermediate layer selected from a group comprising ethylene-hydrolyzed vinyl acetate copolymer and polyethylene terephtalate coated with polyvinylidene chloride for manufacturing protective equipment against NBC attacks. Similarly, Smith, in U.S. Pat. Nos. 4,970,105 and 5,082,721, describes a fabric used in the manufacture of protective garments, containers and covers comprising an inner layer of a tear resistant, high tensile strength substrate and film layer comprised of a fusible, meltable, polyhalogenated ethylene resin group bonded on at least one surface of said high modules fabric substrate.

Bartacis discloses multilayer structure in U.S. Pat. No. 4,924,525. This reference describes a multilayer film structure having an inner layer of substantially isotactic oriented polypropylene homopolymer sandwiched between a layer of ethylene-propylene random copolymer and a layer of ethylene-vinyl-acetate. The multilayer film structure is then bonded to a two layer polyester substrate using an elastomeric adhesive. In a preferred embodiment, a barrier material having a layer of ethylene-vinyl alcohol is combined with a multilayer film structure to form a composite, which is then combined with the substrate. Additionally, Adiletta, in U.S. Pat. No. 4,865,903 describes a flexible, impermeable, universally chemically resistant composite structure which may be fabricated into protective clothing. The composite structure comprises a fabric substrate and thermally-melt-bonded on both sides thereof, a coated film, which coated film comprises a PTFE film having a thermoplastic flouropolymer coating on both sides thereof.

Despite the foregoing disclosures, there is still a need for biological and chemical protective material that can be used in making protective garments, covers, tents and shelters for personnel, equipment and supplies.

SUMMARY OF THE INVENTION

According to the invention there is provided a fabric for chemical protective garments which comprises at least two multilayered film laminates separated by at least one nonwoven scrim which provides a chamber or space for retarding the penetration time or permeation time until breakthrough for a given chemical. Each laminate is sandwiched between films of linear low density polyethylene and comprise multilayers of a film selected from the group consisting of ethyl vinyl alcohol, polyethylene terephthalate and polyamide with the proviso that each laminate has a different multi-layered film.

Advantageously, a tie layer is utilized to form the sandwich. The fabric can be utilized to produce an article of clothing that covers all or any part of the body and provides a barrier between the wearer and chemicals. This may include gloves, coveralls, boots, jacket, pants, hoods, aprons or combination of these components. Other materials may be incorporated in the garment to provide for viewing, sealable openings, fasteners and ventilation means.

Accordingly, a principle object of the present invention is a barrier structure which can retard the permeation rate by solids, liquids and gases.

It is another object of the invention to provide a barrier structure which is light weight and easily fabricated by known industry methods into protective garments, protective covers and the like.

It is a still further object of the invention to provide a barrier structure resistant to chemical and biological agents.

Other objects and advantages of the invention will be better understood from a reading of the preferred embodiments and the drawings wherein.

DESCRIPTION OF THE PREFERRED EMBODIMENTS

According to the present invention there is provided a barrier structure which can be used to prepare light weight chemical protective garments with the ability to stop or retard the permeation of a wide variety of chemicals and hazardous liquids and solids.

It has been found that when at least two different multilayer films each contain a different one of the barrier polymers ethyl vinyl alcohol (EVOH), polyethylene terephthalate (PET) and a polyamide, which preferably is nylon, and the film layers are laminated to a scrim that provides a volumetric chamber or space and each multi-layer film is sandwiched between linear low density polyethylene, there is a synergistic effect in gaining maximum barrier properties against all chemical threats.

Each multi-layer film is sandwiched between films of linear low density polyethylene (LLDPE) which are about 1 mil in thickness for ease in heat sealing to itself and tapes during garment manufacture. The multilayer films all have the same type of basic structure and are blown films in the 2 to 7.5 mil range, preferably about 3 to 6 mil range.

The LLDPE layer may be optionally bonded to the multilayer film with a tie layer of a BYNEL®, NUCREL®, PRIMOCOR®, SURLYN® or ethyl vinyl acetate (EVA).

It is important to use a high loft (light weight) scrim which is readily laminated to the LLDPE surface film on the multilayer protective film layer. The scrim is preferably polyester and is needle punched (most flexibility) and has a weight of 1 to 4 oz/yd$^2$. The scrim provides increased tear resistance and strength to the overall laminated protective fabric. In addition it provides a volumetric chamber or space in which the toxic chemicals permeate into after crossing through the initial outer multilayer protective film barrier layer. The toxic chemical must diffuse through this open area in the middle of the overall protective fabric and then build up enough concentration in order to begin permeating through the second multilayer protective film layer. Therefore the porous layer minimizes the concentration and is an equalizing chamber which minimizes the actual concentration of the chemical vapor at the surface of the second multilayer protective film. This has an additional synergistic effect on increasing the permeation time (barrier resistance) of any chemical coming into contact with the protective suit.

The scrim can consist of fibers selected from the group consisting of polyester, polyethylene, polypropylene, aramid and fire resistant cotton. The scrim can be a single high loft construction or double layered to provide the barrier space.

Figure 1:
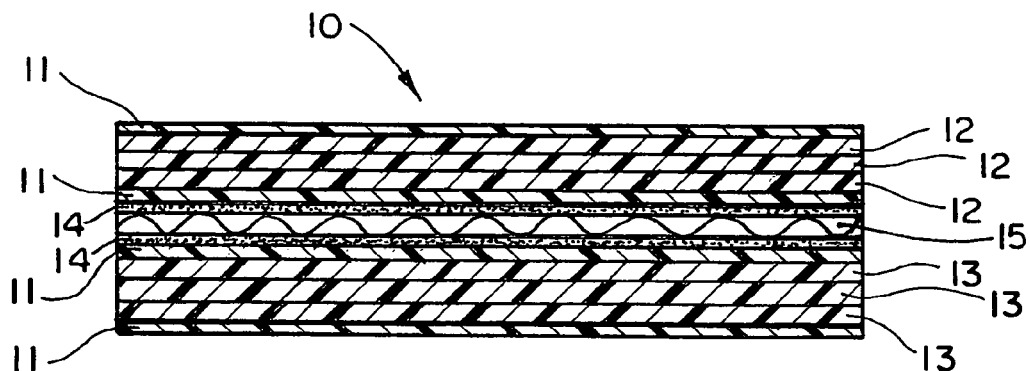
FIG. 1 is a cross-sectional view of a barrier structure of the invention.

As seen in FIG. 1, the barrier fabric (10) has a LLDPE film (11) which sandwiches a laminate comprised of three layers of EVOH (12) which is about 2 to 7.5 mil range. The lower LLDPE film layer is bonded to the scrim (15) with a tie layer (14) which in turn is bonded to a LLDPE film layer (12) of a second multilayer fabric. The second multilayer fabric is a laminate of three PET layers (13) that is bonded to a LLDPE layer (14).

The total sandwich laminated fabric (10) containing the scrim is about 10 to 13 oz/yd$^2$ and about 20 to 28 mils thick when uncompressed.

Figure 2:
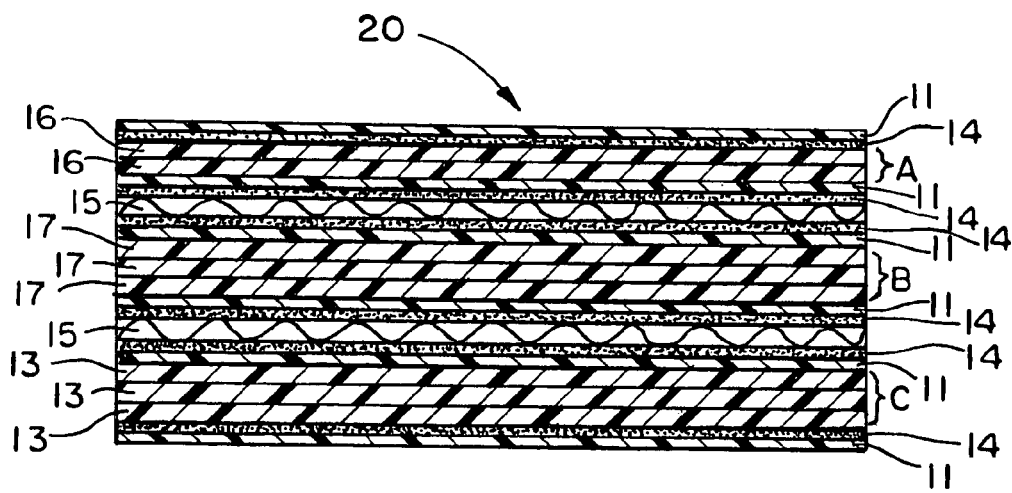
FIG. 2 is a cross-sectional view of another barrier structure of the invention.

As shown in FIG. 2, there is a fabric (20) which is comprised of three laminates (A,B,C) that has two spaces formed by a high loft scrim (15). Laminate A is composed as multilayers (three) of nylon (16) which is adhered by a tie layer (14) to LLDPE (11) on both sides. The laminate A is adhered to a scrim (15) by a tie layer (14) on both sides so as to adhere to laminate B. Laminate B is composed of two layers (17) of EVOH which is sandwiched between two layers of LLDPE (11) and adhered thereto by tie layers (14).

The term "laminate" is used herein to mean a multilayered structure prepared by laminating at least two layers into a fabric.

BYNEL is an unneutralized terpolymer of methacrylic acid, isobutyl acrylate and polyethylene produced by E.I. du Pont de Nemours and Company, Wilmington Del.

It is contemplated that the multilayer structures may be used to form protective garments or barriers without adding a film layer at least to the extent that the multilayer structures provide the desired high strength barrier properties. The fabric layers and the multilayer structures can be made into garments by conventional thermal bonding techniques as described in U.S. Pat. Nos. 4,041,203; 4,374,888 and 4,753,843, which are herein incorporated by reference.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed is:

1. A fabric for chemical protective garments and barriers which retards or stops the permeation of a variety of chemicals and comprises:

At least two multi layered film laminates separated by at least one non-woven scrim having a volumetric chamber to form a barrier space, each of said laminates being sandwiched between a film of linear low density polyethylene, each multilayered film laminate comprising a multilayer film selected from the group consisting of ethyl vinyl alcohol, polyethylene terephthalate and polyamide, with the proviso that each laminate has a different multilayered film.

2. The fabric of claim 1 which is about 10 to 13 oz/yd$^2$ and a thickness of about 20 to 28 mils when physically uncompressed.

3. The fabric of claim 1 wherein said scrim is needle punched.

4. The fabric of claim 3 wherein said scrim has a weight of about 1 to 4 oz/yd$^2$.

5. The fabric of claim 1 wherein the polyamide is nylon.

6. The fabric of claim 1 which is about 2 to 7.5 mil in thickness.

7. The fabric of claim 1 comprising three multi film laminates.

8. The fabric of claim 1 comprising two multi film laminates.

9. A chemical protective garment prepared with the fabric of claim 8.

10. The fabric of claim 1 where said scrim comprises a member selected from the group consisting of polyethylene, polypropylene and fire proof cotton.

11. The fabric of claim 10 wherein said scrim is spunbonded.

12. The fabric of claim 11 wherein said scrim is about 20 to 28 mils thick.

13. The fabric of claim 10 in which a film of an ionomer forms a sandwich with said scrim.

14. The fabric of claim 1 including a tie layer between the linear low density polyethylene and the multi film layers.

15. The fabric of claim 14 wherein said tie layer is an ionomer.

16. The fabric of claim 14 wherein said tie layer comprises ethyl vinyl acetate.

17. The fabric of claim 1 which comprises a fire retardant barrier.

18. A chemical protective garment prepared with the fabric of claim 1.

* * * * *